US006892251B2

(12) United States Patent
Anderson et al.

(10) Patent No.: US 6,892,251 B2
(45) Date of Patent: May 10, 2005

(54) SYSTEM AND METHOD FOR WALK-UP PRINTING (75) Inventors: Jeff M. Anderson, Camas, WA (US); Jeremy Bunn, Kelso, WA (US); Daniel Revel, Portand, OR (US); David Staas, Camas, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 675 days.

(21) Appl. No.: 09/884,318

(22) Filed: Jun. 18, 2001

(65) Prior Publication Data
US 2002/0194404 A1 Dec. 19, 2002

(51) Int. Cl.[7] ............... G06F 3/00; G06F 13/12; G06F 13/38; G06F 15/00
(52) U.S. Cl. ............... 710/20; 710/1; 710/62; 710/64; 710/65; 710/72; 358/1.1; 358/1.13; 358/1.15
(58) Field of Search ............... 710/1, 20, 62, 710/64, 65, 72; 358/1.1, 1.13, 1.15; 719/321, 327; 709/200, 201, 202, 203

(56) References Cited

U.S. PATENT DOCUMENTS

| 5,283,887 A | 2/1994 | Zachery ............ 395/500 |
| 5,406,557 A | 4/1995 | Baudoin ............ 370/61 |
| 5,418,908 A | 5/1995 | Keller et al. ............ 395/200 |

(Continued)

FOREIGN PATENT DOCUMENTS

| EP | 0772327 A2 | 5/1997 |
| EP | 0855821 A1 | 7/1998 |
| EP | 0886206 | 12/1998 |
| EP | 0950969 A2 | 1/1999 |

OTHER PUBLICATIONS

Hewlett–Packard Company patent application, U.S. Appl. No. 09/745,711, filed on Dec. 18, 2000, System And Method For Printing A Document For A Network User.
Hewlett–Packard Company patent application, U.S. Appl. No. 09/697,990, filed on Oct. 27, 2000, Method And System For Printing From An IP Network.
Hewlett–Packard Company patent application, U.S. Appl. No. 09/662,372, filed on Sep. 13, 2000, Method And Apparatus For Printing Via A Wireless Communication Device.
Hewlett–Packard Company patent application, U.S. Appl. No. 09/814,284, filed on Mar. 21, 2001, Mailbox Printing Services For Information Appliances.
Hewlett–Packard Company patent application, U.S. Appl. No. 09/799,381, filed on Mar. 6, 2001, System And Method For Distributed Processing.
Hewlett–Packard Company patent application, U.S. Appl. No. 09/804,607, filed on Mar. 12, 2001, Mobile Remote Systems.

(Continued)

Primary Examiner—Jeffrey Gaffin
Assistant Examiner—Tanh Q. Nguyen (57) ABSTRACT

Disclosed are various systems and methods for printing documents. In one embodiment, a printing system is provided that comprises a host and a local printer coupled thereto, the local printer having a portable device communications port with which to establish a communications link a portable device. The local printer includes means for relaying a non-rendered document received via the portable device communications port to the host for rendering. The host includes means in the host for orchestrating a rendering of the non-rendered document into a rendered document with a printer format compatible with the local printer, the non-rendered document being rendered using one of a number of applications in the host, and, means in the host for transmitting a rendered document to the local printer to be printed.

12 Claims, 3 Drawing Sheets

U.S. PATENT DOCUMENTS

| | | | |
|---|---|---|---|
| 5,436,960 A | 7/1995 | Campana, Jr. et al. | 379/58 |
| 5,774,637 A | 6/1998 | Haber et al. | |
| 5,781,901 A | 7/1998 | Kuzma | 707/10 |
| 5,838,252 A | 11/1998 | Kikinis | 340/825.44 |
| 5,844,969 A | 12/1998 | Goldman et al. | 379/93.24 |
| 5,903,723 A | 5/1999 | Beck et al. | 395/200.3 |
| 5,905,777 A | 5/1999 | Foladare et al. | 379/90.01 |
| 5,937,162 A | 8/1999 | Funk et al. | 395/200.36 |
| 5,958,006 A | 9/1999 | Eggleston et al. | 709/219 |
| 5,964,833 A | 10/1999 | Kikinis | 709/206 |
| 5,974,449 A | 10/1999 | Chang et al. | 709/206 |
| 5,978,837 A | 11/1999 | Foladare et al. | 709/207 |
| 5,995,597 A | 11/1999 | Woltz et al. | 379/93.24 |
| 6,023,700 A | 2/2000 | Owens et al. | 707/10 |
| 6,035,104 A | 3/2000 | Zahariev | 395/200.33 |
| 6,073,165 A | 6/2000 | Narasimhan et al. | 709/206 |
| 6,160,631 A | 12/2000 | Okimoto et al. | 358/1.15 |
| 6,182,059 B1 | 1/2001 | Angotti et al. | 706/45 |
| 6,208,427 B1 * | 3/2001 | Lee | 358/1.15 |
| 6,219,694 B1 | 4/2001 | Lazaridis et al. | 709/206 |
| 6,256,666 B1 | 7/2001 | Singhal | 709/217 |
| 6,275,848 B1 | 8/2001 | Arnold | 709/206 |
| 6,360,252 B1 | 3/2002 | Rudy et al. | 709/206 |
| 6,496,276 B1 * | 12/2002 | Dei et al. | 358/1.15 |
| 6,567,119 B1 * | 5/2003 | Parulski et al. | 348/207.2 |
| 2002/0186393 A1 * | 12/2002 | Pochuev et al. | 358/1.13 |
| 2003/0076529 A1 * | 4/2003 | Gomes et al. | 358/1.15 |

OTHER PUBLICATIONS

Hewlett–Packard Company patent application, U.S. Appl. No. 09/712,337, filed on Nov. 13, 2000, System And Method For Printing To A Printer Without The Use OF A Print Driver.

PCT Application, WO 01/22259; Sinia Corporation; "Transferring E–mail Attachments to Devices for Rendering"; Mar. 29, 2001.

Jeff M. Anderson et al., United States Patent Application entitled "Rendering Broker Service and Method," U.S. Appl. No. 09/884,593; filed on Jun. 18, 2001 (Related Application).

Jeff M. Anderson et al., United States Patent Application entitled "System and Method for Remote Document Retrieval," U.S. Appl. No. 09/884,600; filed on Jun. 18, 2001 (Related Application).

Lainye Reich et al., United States Patent Application entitled "System and Method for Automated Rendering to Print to a File," U.S. Appl. No. 09/884,249; filed on Jun. 18, 2001 (Related Application).

Jeff M. Anderson et al., United States Patent Application entitled "System and Method for Mobile Printing," U.S. Appl. No. 09/974,390; filed on Oct. 10, 2001 (Related Application).

David Staas et al., United States Patent Application entitled "System and Method for Mobile Printing," U.S. Appl. No. 09/884,594; filed on Jun. 18, 2001 (Related Application).

David J. Miller et al., United States Patent Application entitled "System and Method for Configuring a Printing System," U.S. Appl. No. 09/884,598; filed on Jun. 18, 2001 (Related Application).

Dana E. Laursen et al., United States Patent Application entitled "Document Delivery System for Automatically Printing a Document on a Printing Device," U.S. Appl. No. 09/855,230; filed on May. 14, 2001 (Related Application).

Keith M. Taylor et al., United States Patent Application entitled "Limited Printing of Electronically Transmitted Information," U.S. Appl. No. 09/546,059; filed on Apr. 10, 2000 (Related Application).

Pieter J. van Zee et al., United States Patent Application entitled "Validation and Audit of E–Media Delivery," U.S. Appl. No. 09/694,542; filed on Oct. 23, 2000 (Related Application).

Jon A. Brewster et al., United States Patent Application entitled "Document Delivery System for Automatically Printing a Document on a Printing Device," U.S. Appl. No. 09/325,040; filed on Jun. 7, 1999 (Related Application).

Aloke Gupta et al., United States Patent Application entitled "Document Delivery System for Automatically Printing a Document on a Printing Device," U.S. Appl. No. 09/495,013; filed on Jan. 31, 2000 (Related Application).

* cited by examiner

SYSTEM AND METHOD FOR WALK-UP PRINTING

TECHNICAL FIELD

The present invention is generally related to the field of printing and, more particularly, is related to a system and method for walk-up printing.

BACKGROUND OF THE INVENTION

Recent years have seen a proliferation of portable electronic devices such as personal digital assistants (PDA's), cellular telephones, and/or other portable electronic devices. Some such devices also include input/output ports to communicate with computer systems, printers, and other devices using either electrical cables or wireless communication interfaces such as Infrared data communications interfaces. In many cases, these portable electronic devices feature limited computing capacity and correspondingly limited functionality. For example, some personal digital assistants may include enough memory to store a specific number of documents, but may not be able to execute larger applications that are necessary to render the stored documents into a format that is compatible with a particular printer for printing.

In other situations, a portable electronic device such as a laptop computer may not be limited in terms of computer capacity, but may not include the proper applications to render a particular document for a particular printer. For example, assume that a particular document stored in the portable electronic device was received as an attachment to an electronic mail message from a third party. Also assume the third party created the document using a specific word processor that is not included in the portable electronic device. Even thought the user has access to a printer that can interface with the portable electronic device, unfortunately, the document cannot be rendered for printing by the portable electronic device since the portable electronic device does not include the specific word processor.

If any of the above situations exists, a user may find themselves in a place with a printer that can communicate with their portable electronic device, but they would be frustrated in any attempt to print a document from the portable electronic device.

SUMMARY OF THE INVENTION

In light of the foregoing, the present invention provides for various systems and method for printing a document. In one embodiment, a method is provided that includes the steps of relaying a non-rendered document from a local printer to a host coupled thereto, the non-rendered document being received in the local printer from a portable device via a portable device communications port; identifying one of a number of applications in the host that is compatible with the non-rendered document; rendering the non-rendered document with one of the number of applications into a format compatible with the local printer, thereby creating a rendered document; and, sending the rendered document to the local printer for printing.

In another embodiment, the present invention provides for a program stored on a computer readable medium for providing a rendering service in a host. In this respect, the program comprises code that determines a file type of a non-rendered document received from a local printer in data communication with the host, and code that identifies one of a number of applications to render the non-rendered document in the host that is compatible with the file type of the non-rendered document. The program also comprises code that launches one of the number of applications in the host with a set of instructions to print the non-rendered document on the local printer.

In still another embodiment, the present invention provides for a system to print a document on a host computer. In this respect, the system includes a host having a processor circuit with a processor and a memory. The system also includes a document rendering service stored in the memory and executable by the processor. The document rendering service comprises logic that that stores a non-rendered document in the memory, the non-rendered document being received from a local printer in data communication with the host, and logic that determines a file type of the non-rendered document. The document rendering service also comprises logic that identifies one of a number of applications that is compatible with the file type of the non-rendered document to render the non-rendered document in the host, and, logic that launches the one of the number of applications in the host with a set of instructions to print the non-rendered document on the local printer.

In a further embodiment, the present invention provides for a document relay system in a printer. In this respect, the document relay system includes a processor circuit with a processor and a memory, and a portable device communications port coupled to the processor circuit to establish a data communication between the printer and a remote device. Stored on the memory and executable by the processor is a document relay service that comprises logic that determines whether a document received from the remote device via the portable device communications port is rendered in a format compatible with the printer, and, logic that relays the document to a host to be rendered for the printer if the document is not compatible with the printer.

In still an additional embodiment, the present invention provides for a printing system that comprises a host and a local printer coupled thereto, the local printer having a portable device communications port with which to establish a communications link a portable device. The local printer includes means for relaying a non-rendered document received via the portable device communications port to the host for rendering. The host includes means in the host for orchestrating a rendering of the non-rendered document into a rendered document with a printer format compatible with the local printer, the non-rendered document being rendered using one of a number of applications in the host, and, means in the host for transmitting a rendered document to the local printer to be printed.

Other features and advantages of the present invention will become apparent to a person with ordinary skill in the art in view of the following drawings and detailed description. It is intended that all such additional features and advantages be included herein within the scope of the present invention.

BRIEF DESCRIPTION OF THE SEVERAL VIEWS OF THE DRAWINGS

The invention can be understood with reference to the following drawings. The components in the drawings are not necessarily to scale. Also, in the drawings, like reference numerals designate corresponding parts throughout the several views.

DETAILED DESCRIPTION OF THE INVENTION

Figure 1:
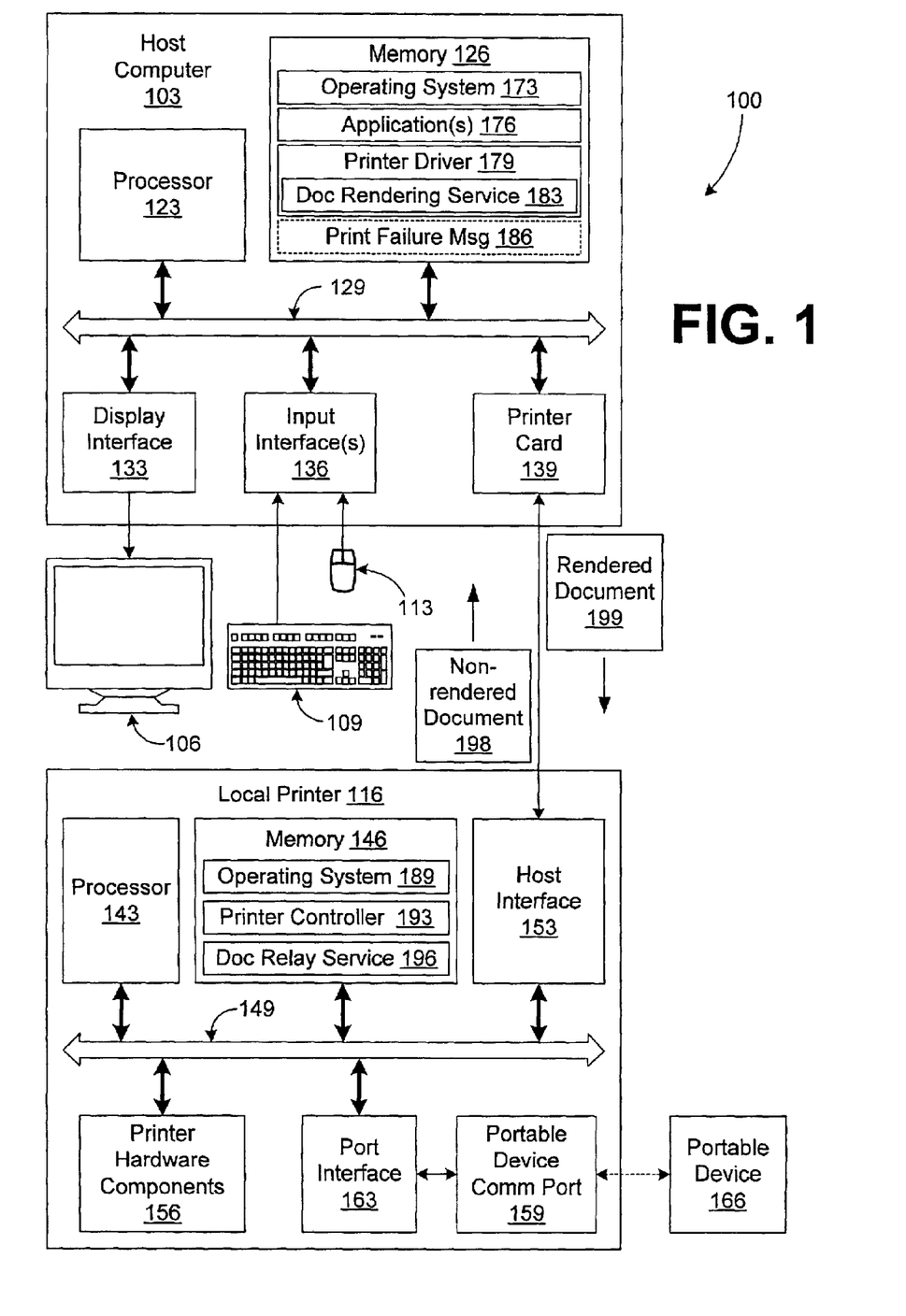
FIG. 1 is a block diagram of a computer system including a host computer and a printer according to an embodiment of the present invention.

With reference to FIG. 1, shown is a computer system 100 that includes a host computer 103 with a number of peripheral devices, including, for example, a display device 106, a key board 109, a mouse 113, and a local local printer 116. Note that the host computer 103 may include other peripheral devices such as, for example, scanners, keypads, touch pads, touch screens, microphones, one or more push buttons, speakers, etc. The display device 106 may be, for example, a cathode ray tube (CRT), liquid crystal display screen, gas plasma-based flat panel display, or other type of display device, etc.

The host computer 103 includes a processor circuit with a processor 123 and a memory 126, both of which are coupled to a local interface 129. The local interface 129 may be, for example, a data bus with an accompanying address/control bus as is generally known by those with ordinary skill in the art. The display device 106 is coupled to the local interface 129 by way of a display interface 133 such as a video card or other display interface 133 with like capability. Likewise, the keyboard 109 and the mouse 113 are coupled to the local interface through various input interfaces 136 and the local printer 116 is coupled to the local interface, for example, through a printer card 139 or other device of like capability. The display interface 133, input interfaces 136, and printer card 139 perform various processing functions and include buffer circuitry to facilitate the communication from the processor 123 to such peripheral devices via the local interface 129 as is generally known by those with ordinary skill in the art.

The local printer 116 also includes a processor circuit with a processor 143 and a memory 146, both of which are coupled to a local interface 149. The local interface 149 may be, for example, a data bus with an accompanying control/address bus as is generally known by those with ordinary skill in the art. The local printer 116 also includes a host interface 153 that provides an interface between the local interface 149 and the printer card 139. In this respect, the printer card 139 and the host interface 153 each may include a port or receptacle that will accommodate a data communications cable or other communications media therebetween. Alternatively, the printer card 139 and the host interface 153 each may also include a wireless transmitter and receiver to establish wireless communication therebetween.

The local printer 116 also includes various printer hardware components 156 such as, for example, motors, indicator lights, sensors, and other components that are driven and/or communicate with the processor circuit in the local printer 116 during the course of general printer operation. A detailed description of the various printer hardware components 156 and of their function is not provided herein as is such as generally understood by those with ordinary skill in the art.

The local printer 116 also includes a portable device communications port 159 that is coupled to the local interface 149 through a port interface 163. In this respect, the port interface 163 may comprise, for example, an interface card or other such device that performs buffering and/or processing functions. These functions are performed in order to make information received and sent through the portable device communications port 159 available and accessible by the processor 143 by way of the local interface 149.

The portable device communications port 159 facilitates communication with a portable device 166. In this respect, the portable device communications port 159 may be an infrared communications port for wireless communication between the portable device 166 and the local printer 116. Alternatively, the portable device communications port 159 may comprise an electrical receptacle to receive a plug and a cable from the portable device 166 to facilitate electrical data communication. Such a receptacle may comprise, for example, a universal serial bus (USB) receptacle, a parallel port receptacle or other receptacle that the portable device 166 can plug into to facilitate the data communications there between. Note that the portable device 166 also includes an appropriate communications port and/or other necessary capability to communicate with the local printer 116.

Referring next to the host computer 103, stored on the memory 126 and executable by the processor 123 are several software components such as, for example, an operating system 173, one or more applications 176, and a printer driver 179. Within the printer driver 179 is a document rendering service 183. The document rendering service 183 may generate a print failure message 186 as will be discussed.

In a similar manner, the local printer 116 includes various software components stored on the memory 146 including, the operating system 189, a printer controller 193, and a document relay service 196. The printer controller 193 is executed by the processor 143 to implement the general functions of the local printer 116 in printing a document as is generally known by those with ordinary skill in the art and not discussed in detail herein. The operation of the document relay service 196 is discussed in later text.

The operating systems 173 and 189 are executed to control the allocation and usage of hardware resources in the host computer 103 and in the local printer 116. Specifically, the operating systems 173 and 189 control the allocation and usage of the memories 126 and 146, processing time, and the peripheral devices as well as performing other functionality. In this manner, the operating systems 173 and 189 serve as the foundation on which applications depend as is generally known by those with ordinary skill in the art.

Also, each of the memories 126 and 146 may include both volatile and nonvolatile memory components. Volatile components are those that do not retain data values upon loss of power. Nonvolatile components are those that retain data upon a loss of power. Thus, each of the memories 126 and 146 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other such of memory device.

Also, each of the processors 123 and 143 may represent multiple processors and each of the memories 126 and 146 may represent multiple memories that operate in parallel processing circuits, respectively. In such a case, each of the local interfaces 129 and 149 may be an appropriate network that facilitates communication between any two of the multiple processors, between any processor and any of the memories, or between any two of the memories, etc. The processors 123 and 143 may be electrical or optical in nature.

Next a discussion of the general operation of the computer system 100 is provided. To begin, assume that a user of the portable device 166 wishes to print one or more documents stored on the portable device 166 in hard copy form. Given that the user has access to the computer system 100, the user may wish to transmit the documents to the local printer 116 by way of the portable device communications port 159 in order to print the documents using the local printer 116. Also assume that the portable device 166 does not have the application necessary to render the document stored in the portable device 166 in a form that the local printer 116 recognizes and can print. This may be the case because the application is either not present or the portable device 166 may not have the computing capacity to execute the application. Therefore, it is necessary to employ a separate agent to perform the rendering of the documents that the portable device 166 cannot.

In any event, the user approaches the computer system 100 and proceeds to download the desired documents to be printed to the local printer 116 through the portable device communications port 159. Upon being informed that a document is to be received by way of the portable device communication port 159, the processor 143 executes the document relay service 196 which temporarily stores the document on the memory 146. The document relay service 196 also determines whether the document is in a form that can be printed by the local printer 116. If not, then the document is a "non-rendered" document 198. The document relay service 196 then transmits the non-rendered document 198 to the host computer 103 by way of the host interface 153 and the printer card 139 using an appropriate communications protocol established between the host computer 103 and the printer 116.

The host computer 103 detects that a non-rendered document 198 has been transmitted from the local printer 116 by virtue of information placed on the local interface 129 by the printer card 139. In response, the processor 123 executes the document rendering service 183 in the printer driver 179 to process the non-rendered document 198. In general, the printer driver 179 is executed in the host computer 103 to facilitate communication between the host computer 103 and the local printer 116.

The document rendering service 183 then stores the non-rendered document 198 on the memory 126 as a temporary file for further processing. The document service 183 then determines a file type of the non-rendered document 198. The file type of the non-rendered document 198 refers to the application 176 that was employed in its creation and/or the application 176 with which the non-rendered document 198 is compatible. Such applications 176 may include, for example, Microsoft Word, a product of Microsoft Corporation of Redmond, Wash.; Word Perfect, a product created by Corel Corporation of Ottawa, Canada; or Adobe Acrobat, a product created by Adobe Systems Incorporated of San Jose, Calif. or other applications 176 as is generally known by those with ordinary skill in the art.

By determining the file type of the non-rendered document 198, the document rendering service 183 can determine which application 176 to execute in order to render and print the non-rendered document 198. Assuming that the application 176 corresponding to the file type of the non-rendered document 198 is present in the host computer 103, then the document rendering service 183 executes the application 176 with instructions that the application 176 print the non-rendered document 198 using the local printer 116. The application 176 then proceeds to render and print the document. Once completed, the application 176 is closed and the temporary copy of the non-rendered document 198 stored in the memory 126 is deleted.

In some circumstances, the proper application 176 that corresponds to the file type of the non-rendered document 198 may not present in the host computer 103. In such a situation, the document rendering service 183 creates the print failure message 186 that indicates the file type of the non-rendered document 198 and the fact that no corresponding application 176 exists in the host computer 103 with which to print the non-rendered document 198. The print failure message 186 is then transmitted to the local printer 116 and is printed out for the user to inform them that the print attempt has failed due to the fact that the necessary application 176 was not present on the host computer 103.

In this manner, a user can print out a document that is stored within their portable device 166 without having the corresponding application 176 to render the document in a format acceptable to the local printer 116. Consequently, the portable device 166 is much more useful in spite of its limited computing capacity. Alternatively, in those situations in which a lack of computing power is not an issue in the portable device 166, but a compatible application 176 is not included in the portable device 166 to render a document for the local printer 116, then the host computer 103 can provide the rendering function thereby to ensure that the document can still be printed on the local printer 116.

Figure 2:
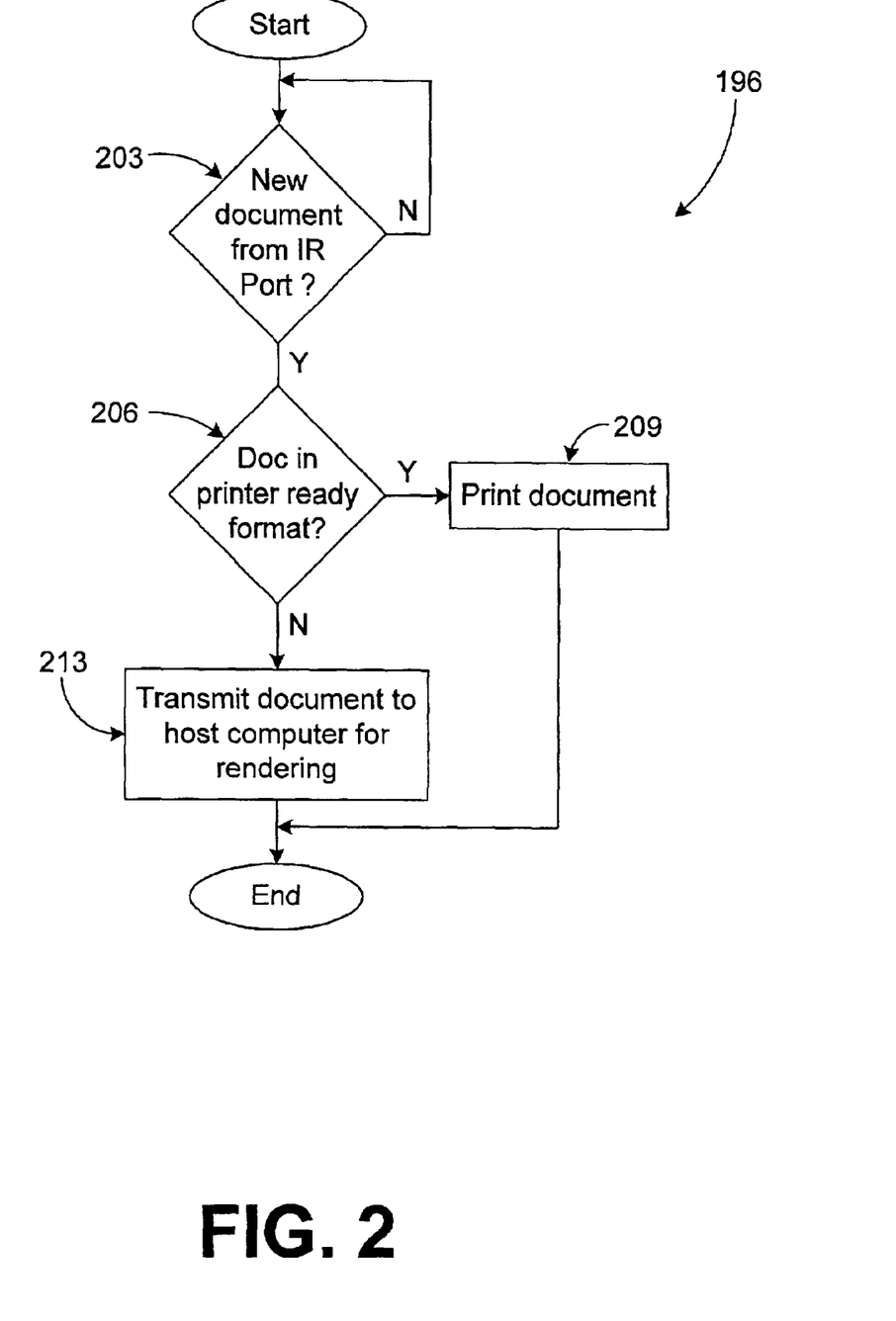
FIG. 2 is a flow chart of a document relay service executed in the printer of the computer system of FIG. 1.

With reference to FIG. 2, shown is a flow chart of the document relay service 196 according to an aspect of the present invention. Alternatively, the flow chart of FIG. 2 may be viewed as depicting steps in a method implemented in the local printer 116. The document relay service 196 is implemented to transmit the non-rendered document 198 (FIG. 1) from the local printer 116 to the host computer 103 when it is determined that the non-rendered document 198 is not in a format that is compatible with the local printer 116 for printing. Beginning with box 203, the document relay service 196 waits for a new document to be downloaded from the portable device communications port 159. Assuming that this occurs, then the document relay service 196 proceeds to box 206 in which it is determined whether the downloaded document is in a printer ready format. Such would be the case if the document was rendered by an appropriate application 176 (FIG. 1) in the portable device 166 (FIG. 1). If so, then the document relay service 196 proceeds to box 209 in which the printing functions of the local printer 116 are implemented as executed by the printer controller 193 (FIG. 1) to print the document. Thereafter, the document relay service 196 ends.

Assuming, however, that the document received from the portable device communications port 159 is not in printer ready format in box 206, then the document relay service 196 proceeds to box 213 in which the non-rendered document 198 is transmitted to the host computer 103 using an appropriate printer communication protocol to be printed by the host computer 103. Thereafter the document relay service 196 ends.

Figure 3:
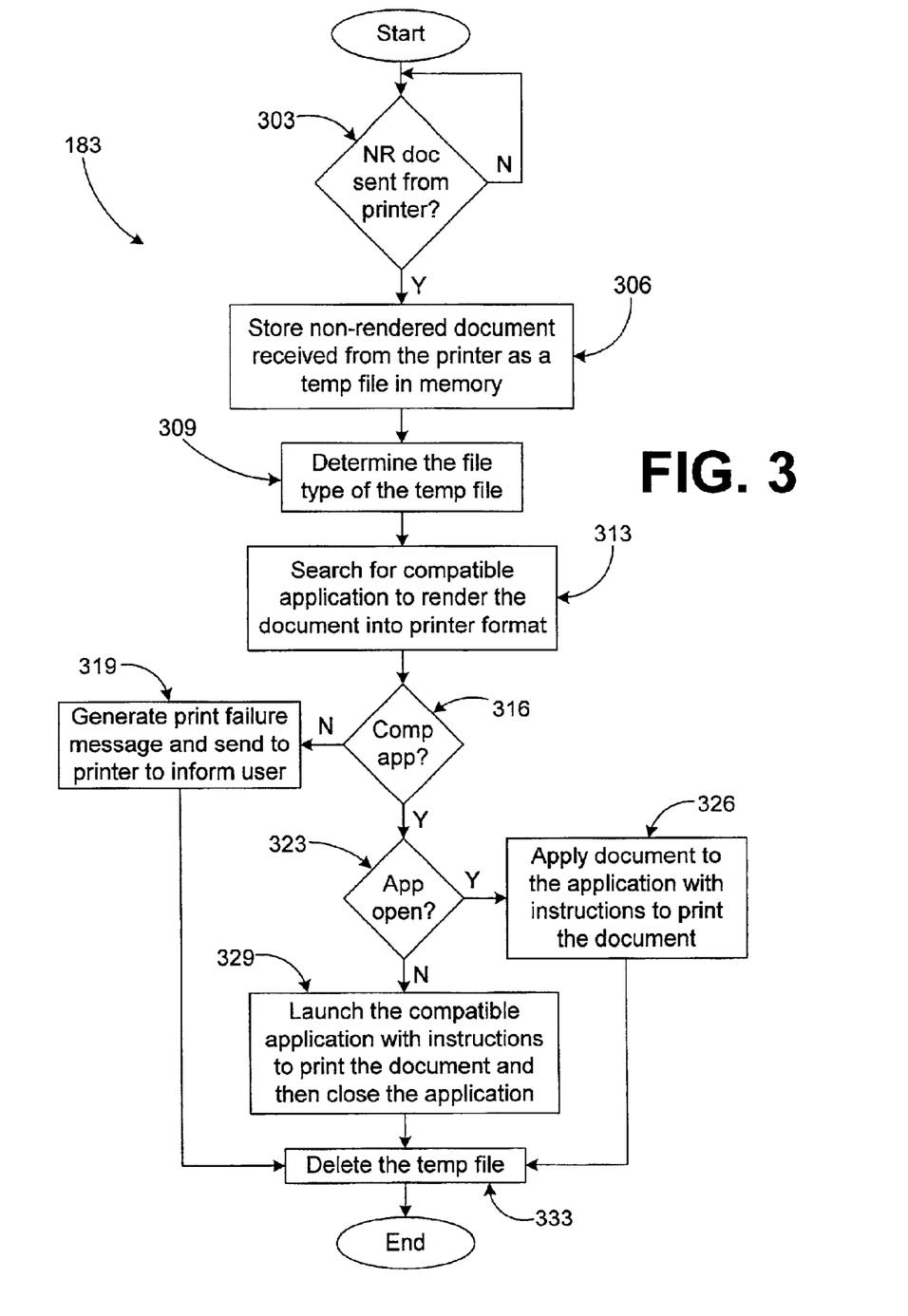
FIG. 3 is a flow chart of a document rendering service executed in the host computer of FIG. 1 according to an aspect of the present invention.

With reference to FIG. 3, shown is a flow chart of the document rendering service 183 according to another aspect of the present invention. Alternatively, the flow chart of FIG. 3 may be viewed as depicting the steps in a method implemented in the host computer 103 to orchestrate the rendering and printing of the non-rendered document 198 using one of the appropriate applications 176.

Beginning with box 303, the document rendering service 183 waits until a non-rendered document 198 (FIG. 1) is sent by the local printer 116 (FIG. 1) to be printed. Assuming a non-rendered document 198 has been sent, then the document rendering service 183 proceeds to box 306 in which the non-rendered document 198 that was received by the local printer 116 is stored in the memory 126 (FIG. 1) as a temporary file. Thereafter, in box 309 the document rendering service 183 determines the file type of the temporary file in the memory 126.

The document rendering service 183 then proceeds to box 313 in which a search is performed for a compatible application 176 (FIG. 1) among all of the applications 176 stored in the memory 126 and executable by the processor 123 (FIG. 1). The appropriate application 176 is that which is compatible with the file type of the non-rendered document 198 that can render the non-rendered document 198 into a rendered document 199 in a printer ready format for printing.

If a compatible application 176 has not been found box 316, then the document rendering service 183 proceeds to box 319. On the other hand, if the compatible application 176 is found, then the document rendering service 183 proceeds to box 323. Assuming the application 176 is found, then in box 323 the document rendering service 183 determines whether the compatible application 176 is currently open and active in the host computer 103. If so, then the document rendering service 183 proceeds to box 326. Otherwise, the document rendering service 183 moves to box 329 in which the compatible application 176 is launched with instructions to print the non-rendered document 198 and then to close itself after the print function is complete. This may be accomplished, for example, by including a hook or other such programming device that includes the instructions that execute the application 176, cause the application 176 to print the document, and cause the application 176 to close itself, etc. Next, the document rendering service 183 proceeds to box 333 in which the temporary file that comprises the non-rendered document 198 is deleted from the memory 126. Thereafter, the document rendering service 183 ends.

Referring back to box 319, assuming that there is no compatible application 176 with the file type discovered in box 313, then the document rendering service 183 generates the print failure message 186 and transmits the message to the local printer 116 for printing. The print failure message 186 informs the user that a compatible application 176 was not found and that the non-rendered document 198 cannot be printed. Thereafter, the document rendering service 183 proceeds to box 333 as shown.

In addition, referring back to box 326, assuming that the application 176 that is compatible with the file type discovered in box 313 is already open, then the non-rendered document 198 is applied to the application 176 with instructions to print the non-rendered document 198. In this circumstance, there is no need to launch or close the application 176 since it was already open in the host computer 103. Thereafter, the document rendering service 183 ends accordingly.

Although the document rendering service 183 (FIG. 3) and the document relay service 196 (FIG. 2) of the present invention are embodied in software or code executed by general purpose hardware as discussed above, as an alternative the document rendering service 183 and/or the document relay service 196 may also be embodied in dedicated hardware or a combination of software/general purpose hardware and dedicated hardware. If embodied in dedicated hardware, the document rendering service 183 and/or the document relay service 196 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The flow charts of FIGS. 2 and 3 show the architecture, functionality, and operation of an implementation of the document rendering service 183 and/or the document relay service 196. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flow charts of FIGS. 2 and 3 show a specific order of execution, it is understood that the order of execution may differ from that which is depicted. For example, the order of execution of two or more blocks may be scrambled relative to the order shown. Also, two or more blocks shown in succession in FIGS. 2 and 3 may be executed concurrently or with partial concurrence. In addition, any number of counters, state variables, warning semaphores, or messages might be added to the logical flow described herein, for purposes of enhanced usability, accounting, performance measurement, or providing troubleshooting aids, etc. It is understood that all such variations are within the scope of the present invention. Also, the flow charts of FIGS. 2 and 3 are relatively self-explanatory and are understood by those with ordinary skill in the art to the extent that software and/or hardware can be created by one with ordinary skill in the art to carry out the various logical functions as described herein.

Also, where the document rendering service 183 and/or the document relay service 196 comprises software or code, it can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the document rendering service 183 and/or the document relay service 196 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although the invention is shown and described with respect to certain preferred embodiments, it is obvious that equivalents and modifications will occur to others skilled in the art upon the reading and understanding of the specification. The present invention includes all such equivalents and modifications, and is limited only by the scope of the claims.

What is claimed is:

1. A printing method, comprising:

determining whether a non-rendered document received in a local printer from a portable device via a portable device communications port is embodied in a format compatible with the local printer;

relaying the a non-rendered document from the a local printer to a host coupled thereto if the non-rendered document is not embodied in the format compatible with the local printer;

identifying one of a number of applications in the host that is compatible with the non-rendered document;

rendering the non-rendered document with the one of the number of applications into a format compatible with the local printer, thereby creating a rendered document; and sending the rendered document to the local printer for printing.

2. The printing method of claim 1, further comprising:

determining a file type of the non-rendered document; and wherein the step of identifying the one of the number of applications in the host that is compatible with the non-rendered document further comprises searching through the number of applications In the host to identify the one of the number of applications that is compatible with the file type.

3. The printing method of claim 1, further comprising storing the non-rendered document received from the local printer in a memory in the host.

4. The printing method of claim 1, further comprising wirelessly communicating with the portable device, wherein the portable device communications port is a wireless communications port.

5. The printing method of claim 1, further comprising the step of rendering the non-rendered document with the one of the number of applications into the format compatible with the local printer further comprises launching the one of the number of applications in the host with instructions to print the non-rendered document using the local printer.

6. The printing method of claim 2, further comprising:

generating a print failure message in the host upon a failure to identify the one of the number of applications in the host that is compatible with the file type;

transmitting the print failure message to the local printer; and printing the print failure message using the local printer.

7. A document relay system in a printer, comprising:

a processor circuit with a processor and a memory;

a portable device communications port coupled to the processor circuit to establish a data communication between the printer and a remote device; and a document relay service stored in the memory and executable by the processor, the document relay service comprising:

logic that determines whether a document received from the remote device via the portable device communications port is rendered in a format compatible with the printer; and logic that relays the document to a host to be rendered for the printer if the document is not compatible with the printer.

8. A printing system, comprising:

a host and a local printer coupled thereto, the local printer having a portable device communications port with which to establish a communications link with a portable device;

means in the local printer for determining whether a non-rendered document received in the local printer from the portable device via the portable device communications port is embodied in a format compatible with the local printer;

means in the local printer for relaying the a non-rendered document to the host for rendering if the non-rendered document is not embodied in the format compatible with the local printer;

means for determining a file type of the non-rendered document;

means for identifying one of a number of applications in the host that is compatible with the file type;

means in the host for orchestrating a rendering of the non-rendered document into a rendered document with a printer format compatible with the local printer, the non-rendered document being rendered using the one of the number of applications in the host; and means in the host for transmitting a rendered document to the local printer to be printed.

9. The printing system of claim 8, wherein the host further comprises means for storing the non-rendered document relayed by the local printer In a memory in the host.

10. The printing system of claim 8, wherein the portable device communications port is a wireless communications port to facilitate a wireless communication link between the printer and the portable device.

11. A printing system, comprising:

a host and a local printer coupled thereto, the local printer having a portable device communications port with which to establish a communications link with a portable device;

means in the local printer for determining whether a non-rendered document received in the local printer from the portable device via the portable device communications port is embodied in a format compatible with the local printer;

means in the local printer for relaying the a non-rendered document to the host for rendering if the non-rendered document is not embodied in the format compatible with the local printer;

means in the host for orchestrating a rendering of the non-rendered document into a rendered document with a printer format compatible with the local printer, the non-rendered document being rendered using the one of the number of applications in the host;

means in the host for transmitting a rendered document to the local printer to be printed; and wherein the means in the host for orchestrating the rendering of the non-rendered document into the rendered document further comprises means for launching the one of the number of applications in the host with instructions to print the non-rendered document using the local printer.

12. The printing system of claim 8, further comprising:

means in the host for generating a print failure message upon a failure to Identify the one of the number of applications in the host that is compatible with the file type; and means for transmitting the print failure message to the local printer.

* * * * *